United States Patent [19]

Kust et al.

[11] Patent Number: 5,403,495
[45] Date of Patent: Apr. 4, 1995

[54] FLUORIDE REMOVAL SYSTEM

[75] Inventors: Roger N. Kust, Spring; Surendra K. Mishra, The Woodlands, both of Tex.; James B. Pfeiffer, Wexford, Pa.

[73] Assignee: Tetra Technologies, Inc., The Woodlands, Tex.

[21] Appl. No.: 137,374

[22] Filed: Oct. 14, 1993

Related U.S. Application Data

[63] Continuation of Ser. No. 847,499, Mar. 13, 1992, abandoned.

[51] Int. Cl.$^6$ .............................................. C02F 1/58
[52] U.S. Cl. .................................. 210/710; 210/713; 210/714; 210/717; 210/724; 210/726; 210/915; 423/490
[58] Field of Search ............... 210/702, 710, 713, 714, 210/717, 724, 915, 726; 423/490

[56] References Cited

U.S. PATENT DOCUMENTS

| | | | |
|---|---|---|---|
| 2,428,418 | 10/1947 | Goetz et al. | 210/915 |
| 3,551,332 | 12/1970 | Baumann et al. | 210/915 |
| 3,738,932 | 6/1973 | Kostenbader | 210/712 |
| 4,081,369 | 3/1978 | Li et al. | 210/22 R |
| 4,145,282 | 3/1979 | Bruckenstein | 423/163 |
| 4,226,710 | 10/1980 | Bruckenstein | 210/714 |
| 4,320,012 | 3/1982 | Palm et al. | 210/915 |
| 4,323,462 | 4/1982 | Bruckenstein | 210/714 |
| 4,465,597 | 8/1984 | Herman et al. | 210/915 |
| 4,698,163 | 10/1987 | Zibrida | 210/713 |
| 4,851,123 | 7/1989 | Mishra | 210/609 |
| 5,039,428 | 8/1991 | Wentzler et al. | 210/713 |
| 5,043,072 | 8/1991 | Hitotsuyanagi | 210/638 |

FOREIGN PATENT DOCUMENTS 60-187393  9/1985  Japan .................................. 210/714

OTHER PUBLICATIONS

Letter from Tetra Technologies, Inc. to Mobil Oil Corporation 1991 dated Jul. 30, 1990.
Letter from Tetra Technologies, Inc. to Mobil Oil Corporation dated Oct. 19, 1990.
Letter from Mobil Oil Corporation to Tetra Technologies, Inc. dated Oct. 29, 1990 forwarding executed confidentiality agreement.
Letter from Tetra Technologies, Inc. to Mobil Oil Corporation dated Feb. 26, 1991.
Letter from Tetra Technologies, Inc. to Mobil Oil Corporation dated Mar. 13, 1991.
Letter from Tetra Technologies, Inc. to Mobil Oil Corporation dated Apr. 3, 1991.
Letter to Tetra Technologies, Inc. from Mobil Oil Corporation dated Apr. 9, 1991.
Letter from Tetra Technologies, Inc. to Mobil Oil Corporation dated Dec. 30, 1991.
Letter from Tetra Technologies, Inc. to Mobil Oil Corporation dated Jan. 9, 1992.
Letter from Tetra Technologies, Inc. to Amoco Oil Co. dated May 17, 1991 and resulting confidentiality agreement.

(List continued on next page.)

*Primary Examiner*—Peter A. Hauskoci
*Attorney, Agent, or Firm*—Arnold, White & Durkee

[57] ABSTRACT

A method for removing dissolved fluoride from waste water involving a multiple stage process which includes a first step of contacting a solution comprising calcium fluoride with a calcium ion source to form a first precipitate and a second step of contacting the first precipitate comprising the calcium ion source with the fluoride-containing waste water solution to form a second precipitate. A first portion of the solution that has been treated directly with the waste water and which contains the second precipitate, is preferably recycled, along with calcium fluoride, to the first step for contact with the calcium ion source. A second portion of the solution treated with the waste water may be transported to a thickener or gravity settling step, and/or to a solids-dewatering step wherein standard filtration equipment may be used to produce a filter cake having a controlled particle size distribution. Where flocculant is added, a pH of 8 is preferred in both the calcium-addition step and the waste water-addition step.

19 Claims, 3 Drawing Sheets

OTHER PUBLICATIONS

Letter from Tetra Technologies, Inc. to Phibro Refining, Inc. dated May 22, 1991.

Confidentiality agreement between Tetra Technologies, Inc. and Phibro Refining, Inc. executed Jul., 30, 1991.

Letter from Tetra Technologies, Inc. to Phibro Refining, Inc. dated Nov. 6, 1991.

Letter from Tetra Technologies, Inc. to Phillips 66 dated Aug. 7, 1991.

Letter from Tetra Technologies, Inc. to Valero Refining Company dated Aug. 7, 1991.

Letter to Tetra Technologies, Inc. from Badger Engineers dated Nov. 14, 1991 with executed confidentiality agreement.

Letter from Tetra Technologies, Inc. to Badger Engineers dated Nov., 27, 1991.

Letter from Tetra Technologies, Inc. to Badger Engineers dated Jan. 6, 1992.

Fig. 3 LEGEND:
☐ CONVENTIONAL @ 0.0

Fig. 4 LEGEND:
☐ CONVENTIONAL SLUDGE
▥ INVENTION

FLUORIDE REMOVAL SYSTEM

This application is a continuation of application Ser. No. 07/847,499, filed Mar. 13, 1992, now abandoned.

BACKGROUND OF INVENTION

1. Field of the Invention

In a broad aspect, this invention relates to removal of fluoride from waste streams, particularly spent aqueous hydrogen fluoride waste water from catalytic alkylation units. In a specific aspect, the invention provides a method for removing dissolved fluoride with an enhanced calcium fluoride precipitate that may be continuously recycled for controlled particle growth.

2. Related Art

Many processes require fluoride, as hydrofluoric acid or in combination with other acids. For example, hydrofluoric acid is used in surface treatment of metals as part of finishing procedures. Hydrofluoric acid is also used as a catalyst in the conversion of normal octane gasolines to highly branched isomers such as iso-octane. Industry has recognized that removal of dissolved fluoride from these waste water streams is generally a desirable and often necessary procedure.

The occurrence of fluoride in these waste streams can vary from a few milligrams per liter to tens of percent. Other dissolved contaminants typically include metals, such as iron, chromium, nickel and manganese balanced with fluoride ions ($F^-$). These metals are often balanced with other acids, such as nitric acid ($HNO_3$), hydrochloric acid (HCl), and sulfuric acid ($H_2SO_4$). The acids are typically present in excess of quantities that would be required to balance the metals, creating a low pH solution and assuring that all of the metals are soluble. Substantially all of the contaminants are dissolved in the waste waters, such that both the metals and the balancing ions are in the ionic form (e.g., iron as $Fe^{+3}$ or $Fe^{+2}$ chloride as $Cl^-$, fluoride as $F^-$, etc.).

While conventional methods are available for removing fluoride from waste water, these methods have a number of shortcomings. While most metals contained in waste waters will precipitate as an insoluble hydroxide precipitate, fluoride, itself being an anion, will not react with hydroxide to form an insoluble compound. Fluoride will, however, react with the calcium in lime, a common reagent used for neutralization of waste waters. In that case, insoluble calcium fluoride ($CaF_2$) is formed and the fluoride removed as solid precipitate. Other alkaline species, such as sodium hydroxide (NaOH), potassium hydroxides (KOH) and ammonium hydroxide ($NH_4OH$), cannot remove the fluoride.

Ferric sulfate [$Fe_2(SO_4)_3$] forms trivalent iron ions ($Fe^{+3}$) and divalent sulfate ions ($SO_4^{-2}$) in waste water. Similarly, hydrofluoric acid forms hydrogen ions ($H^+$) and fluoride ions ($F^-$). The ferric hydroxide [$Fe(OH)_3$] and calcium fluoride ($CaF_2$) are highly insoluble and tend to form solid precipitates. Other metals present also form insoluble hydroxides, much the same as the ferric iron. The metal hydroxide and calcium fluoride precipitates may be separated from the remaining water with a settling device, such as a thickener. The settling device may produce a sludge containing the settled precipitates and a water effluent that is relatively free of suspended and dissolved metals and fluoride. Disadvantages of conventional systems include the frequent need for large and/or numerous expensive thickeners because of the need for a large settling area.

Spent hydrofluoric acid catalysts from refinery alkylation units typically are discharged as a neutral to alkaline solution, e.g., pH of 7 to 13, resulting from pretreatment of the hydrofluoric acid with NaOH or KOH. This neutralized spent catalyst solution may contain around 3 to 10 percent $F^-$ in the form of NaF and/or KF, which is very concentrated from a treatment standpoint. Caustic materials are added to neutralize the free acidity and thus reduce the hazardous nature of the catalyst solution. The concentrated catalyst solution often requires further treatment with a calcium compound to precipitate the fluoride. The treatment results in a highly voluminous and gelatinous precipitate that is difficult to settle and dewater. The usual approach has been to dewater the material by using high pressure filters and employing very long cycle times or by using large area settling ponds. It is therefore desirable to develop a process which will require minimal or no thickening and which preferably produces a concentrated, non-gelling precipitate that can be dewatered efficiently to a highly concentrated cake. Such a process would also permit more efficient recycling of the calcium fluoride product for industrial uses, such as regenerating the HF for reuse as a catalyst in an alkylation reaction.

SUMMARY OF THE INVENTION

In a broad aspect, the present invention relates to a method for removing fluoride from aqueous solutions. In a specific aspect, the invention relates to a method for removing dissolved fluoride from waste water containing medium to high levels of fluoride contamination. The method includes a pretreatment step, in which a solution comprising a calcium fluoride or magnesium fluoride precipitate, preferably enhanced calcium fluoride, is contacted with a calcium or magnesium ion source to provide a treating solution that includes a precipitate of the calcium or magnesium fluoride on the surfaces of which additional calcium or magnesium is associated and which has the capability of associating with fluoride ions. The method also includes a treatment step in which the treating solution, including the calcium-rich or magnesium-rich precipitate, is contacted with the fluoride-containing aqueous solution, typically waste water, to form an enhanced calcium fluoride or enhanced magnesium fluoride precipitate (an "enhanced precipitate") that includes both the calcium or magnesium ion and a fluoride ion from the waste water.

A first portion of the solution that has been treated directly with the waste water and which contains the enhanced precipitate is preferably recycled back to the pretreatment step for contact with the calcium or magnesium ion source. By sequentially contacting a calcium fluoride or magnesium fluoride precipitate with the calcium or magnesium ion source and the fluoride ion, preferably in that order, followed by recycling the resulting enhanced precipitate for contact with additional calcium or magnesium ions in the pretreatment step, not only may fluoride be removed from the waste water, but the particle size of the enhanced precipitate may be increased and controlled.

A second portion of the solution that has been treated directly with the waste water but not recycled may be transported to a thickener, a gravity settling step, and/or a solids-dewatering step to provide a filter cake having a controlled particle size distribution. After a process in accordance with this invention, including recycle, has been followed through a number of cycles, the second portion of the solution will preferably include a substantial proportion of enhanced precipitate having a relatively large particle size. Where flocculant is added to the system, a pH of from about 6 to 8 is preferred in both the calcium/magnesium addition pretreatment step and the waste water addition treatment step.

Benefits of this invention include the ability to produce precipitates which have improved filterability and settling rates, and the provision of a filter cakes of high purity and improved particle size distribution. Such a filter cake may advantageously be useful for the preparation of hydrofluoric acid or other fluoride chemicals. A particular benefit of a specific embodiment of the invention is the ability to control particle size, e.g., by providing a monomodal rather than a bimodal size distribution. In another aspect, the invention may also provide an easily managed system for removing substantially all the soluble fluoride from waste solutions containing high concentrations of fluoride, such as spent alkylation catalyst solutions.

DETAILED DESCRIPTION AND PREFERRED METHOD

The term "enhanced calcium fluoride" in this patent refers to a precipitate that comprises calcium fluoride together with additional calcium and fluoride ions, preferably a calcium fluoride which has been exposed sequentially to the additional calcium and fluoride ions, to provide particle growth for the calcium fluoride.

The term "calcium-rich precipitate" refers to calcium fluoride, preferably an enhanced calcium fluoride precipitate, that has been contacted with additional calcium ions and which is capable of being associated with additional fluoride ions.

In accordance with this invention, it is contemplated that the association between the calcium fluoride and the calcium or fluoride ions is adsorption, but it may be broadly defined as any physical or chemical attraction that would result in the formation of an enhanced precipitate that includes both the calcium fluoride and the calcium and fluoride ions, the ions preferably being associated in the form of calcium fluoride.

The term "calcium ion source" in this patent broadly includes any source of calcium ion, including but not limited to calcium chloride, calcium hydroxide, calcium nitrate, calcium acetate, calcium carbonate, and any soluble calcium compound. The term "solids" means a precipitate or particles, including calcium fluoride and/or a form of enhanced calcium fluoride precipitate. The term "processed" includes flow from vessel to vessel by gravity or by means of a suitable pumping and valving arrangement. It may also include reaction in stirred or unstirred vessels such as a tank or a reactor, particularly an in-line reactor.

In a preferred aspect, the invention involves contacting calcium fluoride with a calcium source to form a calcium-rich precipitate in the pretreatment stage, followed by contacting the calcium-rich calcium fluoride precipitate with the fluoride-containing waste water in the treatment stage to provide an enhanced calcium fluoride precipitate available for recycle and/or separation and dewatering.

It is contemplated, however, that the invention may involve the use of magnesium in the place of calcium, in which case the pretreatment stage involves contacting magnesium fluoride with a magnesium ion source, and the treatment stage involves contacting the magnesium-rich precipitate with the waste water to provide an enhanced magnesium fluoride precipitate, which is then available for recycle and/or separation and dewatering.

Figure 1:
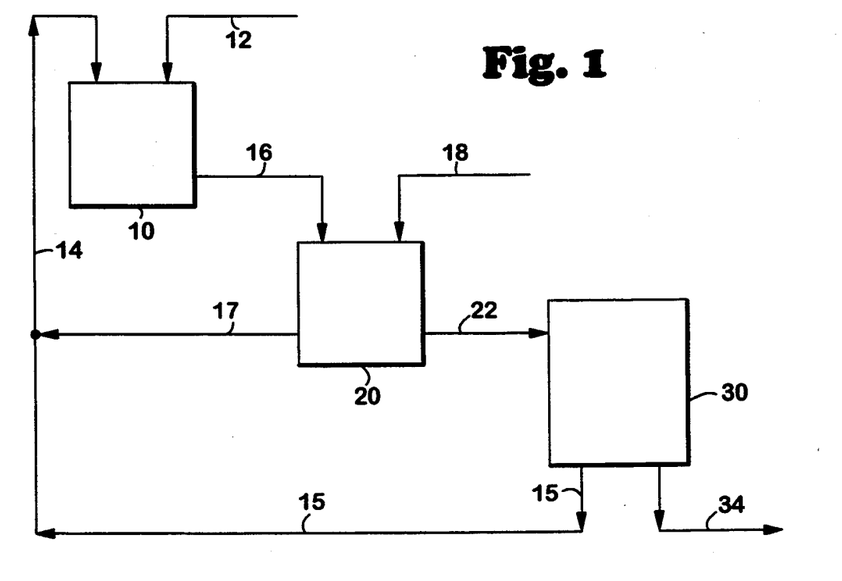
FIG. 1 is a flow diagram of a preferred embodiment of the invention, involving two separate reactors with a recycling stream and a solids-dewatering step.

Referring to FIG. 1, a preferred embodiment of the invention is a multiple stage continuous process in which enhanced calcium fluoride precipitate transported through the system is used to treat a waste stream comprising fluoride. The waste stream which is to be treated, having dissolved fluoride ions, is exemplified as a spent catalyst waste material. Incoming spent catalyst waste material is processed in treatment reactor 20 together with calcium-rich precipitate from pretreatment reactor 10.

Pretreatment occurs in reactor 10, to which a calcium ion source in the form of calcium chloride is fed via stream 12, resulting in contact with the recycled portion of the enhanced calcium fluoride sludge, which enters via stream 14. This enhanced sludge has resulted from previous treatment with the fluoride-containing waste water solution in treatment reactor 20. Sufficient solids and calcium reagent necessary to precipitate the fluoride in treatment reactor 20 are mixed for a sufficient time in pretreatment reactor 10 to provide for association between the previously precipitated calcium fluoride particles, preferably enhanced fluoride particles, and calcium ions.

In the pretreatment stage the particle size of the calcium fluoride precipitate is built up with the added calcium ions. The resulting calcium-rich precipitate from reactor 10 is fed as stream 16 to treatment reactor 20, to which the waste water is also fed via stream 18. In reactor 20, the calcium-rich precipitate is contacted with the fluoride ions from waste stream 18.

In a preferred aspect, the order in which the chemicals are mixed is an important feature of this invention. For example, if the waste fluoride stream is mixed with previously precipitated calcium fluoride particles that have not been pretreated with calcium ions, the surface reactions (e.g., adsorption) are not considered to take place to a great extent. Rather, a calcium fluoride precipitate, such as the recycled enhanced calcium fluoride sludge, should be contacted with a calcium ion source such as calcium chloride prior to contacting the incoming waste water.

Referring once again to the embodiment shown in FIG. 1, the recycled portion of the contents of reactor 20 are returned by stream 14 to reactor 10 and contacted with the calcium ions from stream 12 prior to association with the fluoride ions contained in incoming waste stream 18. In one version of the process, the enhanced precipitate in reactor 20 is recycled directly, without solids-liquid separation, through lines 17 and 14. In an alternative version, the contents of reactor 20, including the enhanced precipitate, is passed through separator 30 and lines 15 and 14.

The purpose of the separator 30 is to separate solids from liquid, thus concentrating the sludge before recycling the fines or liquid portion via lines 15 and 14 and dewatering the solids-rich component via line 34 through standard filtration equipment (not shown). Separator 30 may include any device for separating solids from liquids, such as but not limited to a settling tank, thickener, filter or hydrocyclone.

The recycle ratio of calcium fluoride and/or enhanced calcium fluoride for the invention is preferably from one to 60 and more preferably from 5 to 30 times the amount of calcium fluoride precipitate and/or enhanced calcium fluoride precipitate formed in the treatment stage. For example, if one (1) gram of calcium fluoride and enhanced calcium fluoride is precipitated every minute from fluoride in the waste stream (in reactor 20), then at a 20:1 recycle ratio 20 grams of calcium fluoride precipitate are recycled through stream 14.

The amount of calcium ions introduced to the system via stream 12 should be approximately equal to the stoichiometric amount that would balance the fluoride ions introduced via stream 18. It is preferred that a greater than stoichiometric amount of calcium ions be added to the system to assure sufficient if not complete precipitation of the fluoride ions, for example, as much as about 20% or 30% above the calculated stoichiometric amount. At these levels, fluoride residuals may be as low as 1 to 2 milligrams per liter, effectively removing substantially all of the soluble fluoride.

A particularly advantageous application of the present invention involves a method of removing soluble fluoride from a spent hydrofluoric alkylation catalyst waste water stream. Here it is contemplated that the system may have a pretreatment reactor 10 and a treatment reactor 20, i.e., two physically separate vessels, for the calcium addition and waste water treatment. Although the residence time in each reactor is generally a function of the reactor design and the mixer mechanism, the residence times should be at least about 0.5 minute to provide sufficient contact among the ingredients.

The operation described generally above involves mixing in reactor 10 a recycle stream 14 containing from about 0.5 to 5 percent suspended calcium fluoride precipitate with stream 12 having a calcium chloride concentration in an amount sufficient to react in at least stoichiometric proportion with the fluoride in the incoming waste water, for example, from about 0.5 to 5 percent. [To reactor 10 there is also added recycled sludge containing solid precipitate in an amount sufficient to equal the recycle rate, preferably from about 5 to 30 times the quantity of calcium fluoride precipitate formed in reactor 20, measured on a dry basis. The mixture in reactor 10 may then be stirred for a sufficient time, preferably for at least from about 0.5 to 5 minutes, to provide for dispersion of chemicals and association between the calcium ions and the recycled precipitate. Stream 14 may be configured to contain flows from streams 15 and 17 individually or in combinations of different ratios.

Next, a waste water containing dissolved fluoride is fed to reactor 20, so that the calcium-rich precipitate from reactor 10 is contacted with the incoming waste water in reactor 20, and the dissolved fluoride is associated with the calcium-rich precipitate. This mixture is stirred for a sufficient time to provide for dispersion of the chemicals and association between the calcium-rich precipitate and the fluoride, preferably at least for from 0.5 to 10 minutes, resulting in an aqueous solution containing enhanced calcium fluoride precipitate. As mentioned above, when magnesium is used instead of calcium, the treatment step will result in an enhanced magnesium fluoride precipitate.

Figure 2:
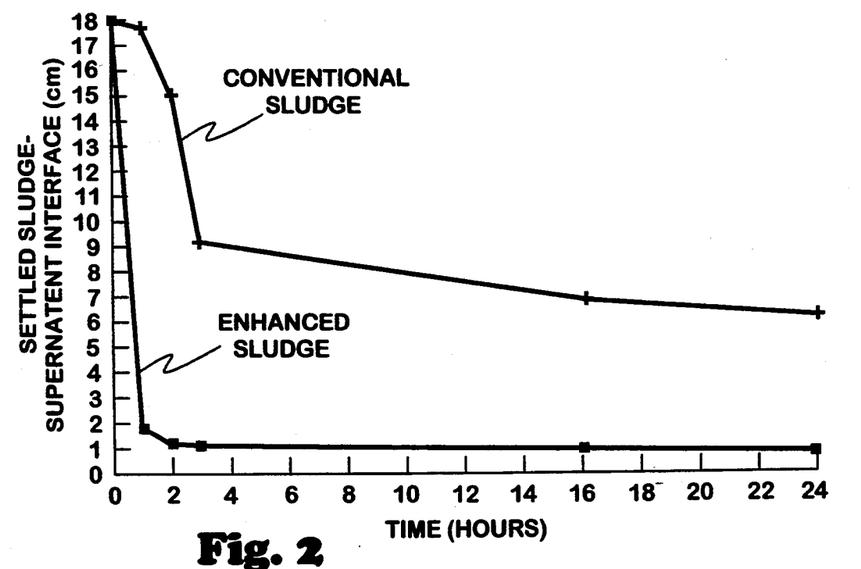
FIG. 2 is a graphical depiction of improved settling characteristics of the enhanced calcium fluoride precipitate.
Figure 3:
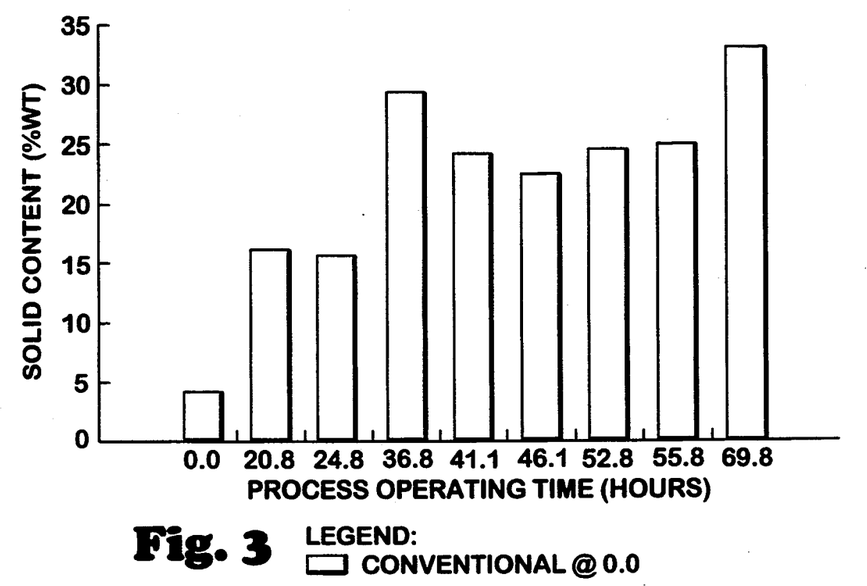
FIG. 3 is a graphical depiction of the concentrations of settled enhanced calcium fluoride precipitate.

Referring now to the drawings, FIG. 2 shows the improved settling characteristics of enhanced calcium fluoride precipitate compared to conventionally produced material at a solids concentration of 4.4% (w/w). The lower settled sludge-supernatant interface heights in the case of enhanced calcium fluoride precipitate suggest that sludge comprising the enhanced precipitate of this invention advantageously may settle many times faster than conventional calcium fluoride sludge at the same solids concentration. FIG. 3 shows that after 24 hours the percentage of solids in the settled sludge increases substantially (e.g., to 15 wt. %) after 20 hours of operating time, when the enhanced calcium fluoride particles have been built up through successive recycling.

It has been discovered that the enhanced calcium fluoride of this invention may also settle to a much higher solids content than that produced by conventional processes; that is, upon settling the sludge is denser and packs more tightly. As shown in FIG. 3, the enhanced calcium fluoride precipitate of the invention settles to over 30% solids (w/w) with only gravity settling. In comparison, conventionally produced calcium fluoride sludge settled to only 4% (w/w) solids content.

The calcium ions are preferably added to the recycle stream in reactor 10 in at least stoichiometric proportions with the fluoride ions that exist in the waste water so that the fluoride may be removed in reactor 20 when it associates with the calcium-rich fluoride precipitate. While in general the pH in the system is not critical, it should be maintained between about 3 and 12, preferably at 8, particularly when flocculants are being added for further dewatering of the sludge generated from the process.

Figure 4:
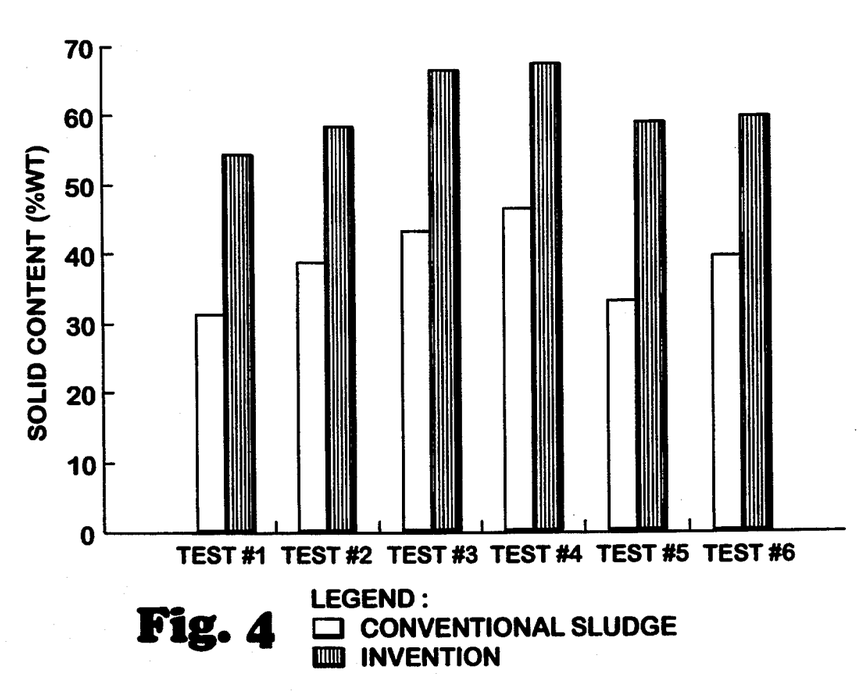
FIG. 4 is a graphical depiction of improved dewatering characteristics of enhanced calcium fluoride precipitate compared to conventional calcium fluoride.

The filtration rates shown in Table IV indicate that a process of the invention provides a enhanced fluoride precipitate that exhibits a ten-fold improvement in filtering rate over processes that produce conventional calcium fluoride sludge. Further, as shown in Table III and FIG. 4, a final solids concentration of filter cakes resulting from this invention was as much as 68% (w/w). In contrast, a conventional process using calcium fluoride without recycling or successive contact with calcium and fluoride ions attained only a range of about 30% to 46% solids (w/w) (see Table III and FIG. 4).

The increased settling rates, characteristics and concentrations of the invention have the benefit of providing precipitates that can be processed with much smaller equipment than conventional processes, for example, smaller and/or fewer thickeners, which should provide substantial cost savings. Further processing in accordance with the invention may include thickening, centrifuging, or filtering as shown in FIG. 1, and may also include drying, depending on the final disposition of the enhanced fluoride precipitate.

The following examples are provided to further explain aspects of the invention. These examples are merely illustrative and are not to be used to restrict the scope of the invention, which is determined by looking to the claims of this patent.

EXAMPLES

Example 1

Examples 1–3 refer to treatment of a fluoride-containing effluent stream from a refinery alkylation unit in accordance with the invention. Prior to treatment, the waste stream contained about 11,500 to 14,000 mg/L after removal of oily materials and had a pH of 5.3 and a density of 1.02 g/cc. After treatment in accordance with the invention, the fluoride content of the waste stream was reduced to about 3–9 ppm. The filter cake was analyzed, and found to have $CaF_2$ content of more than 97 weight percent and a mean particle diameter of about 3.4 micrometers.

Example 2

Referring to Table I, the waste stream described in Example 1 was treated in accordance with the invention using a system similar to that shown in FIG. 1 for a period of slightly over one month. A 38% calcium chloride solution was diluted with water to a predetermined level before being added to the pretreatment reactor 10. The calcium chloride solution feed rate varied from about 6 to about 9 ml/min; the rate of the recycle stream varied from about 80–10 ml/min; the feed rate of the waste stream was maintained at about 10 ml/min; and the pH in the reactors was eventually raised to a range of from about 6 to 9. Measurements of various process parameters, taken at 28 intervals, are reflected in Table I.

Table I shows the filtration times for filter cakes formed from slurry taken from treatment reactor 20 at the indicated intervals. Also reported is the height of the sludge (in cm) that accumulated over a 24-hour period when slurry from reactor 20 was allowed to settle in a 25 ml cylindrical container. Table I also shows the percent solids in the slurry and the settled sludge as well as the moisture content in the resulting filter cakes.

The fluoride concentrations measured at various intervals during the test program were recorded at between about 3 and 9 ppm. In contrast with the compact settling values generally shown in Table I, conventional calcium fluoride sludge settled to a height of about 4 cm in a 25 ml container after 24 hours, the solids content of the settled sludge being 3.1 wt. %.

TABLE I

| MOIST. INTERVAL | SOLID CONC. RECY. SLURRY (% w/w) | 24 HR SETTLES SLUDGE | | CAKE (% w/w) |
|---|---|---|---|---|
| | | Height (cm) | Solid Conc. (% w/w) | |
| o/ Conventional | 1.40 | 4.0 | 4.4 | — |
| 1 | 2.16 | 1.3 | 16.04 | 52.9 |
| 2 | 2.52 | 1.7 | 15.52 | 50.7 |
| 3 | 3.32 | 1.0 | 29.35 | 44.9 |
| 4 | 3.69 | 1.5 | 24.09 | 37.3 |
| 5 | 3.58 | 1.5 | 22.80 | 41.7 |
| 6 | 3.59 | 1.3 | 24.59 | 46.3 |
| 7 | 3.51 | 1.25 | 25.25 | 46.1 |
| 8 | 5.28 | 1.5 | 33.53 | 42.8 |

Example 3

Figure 5:
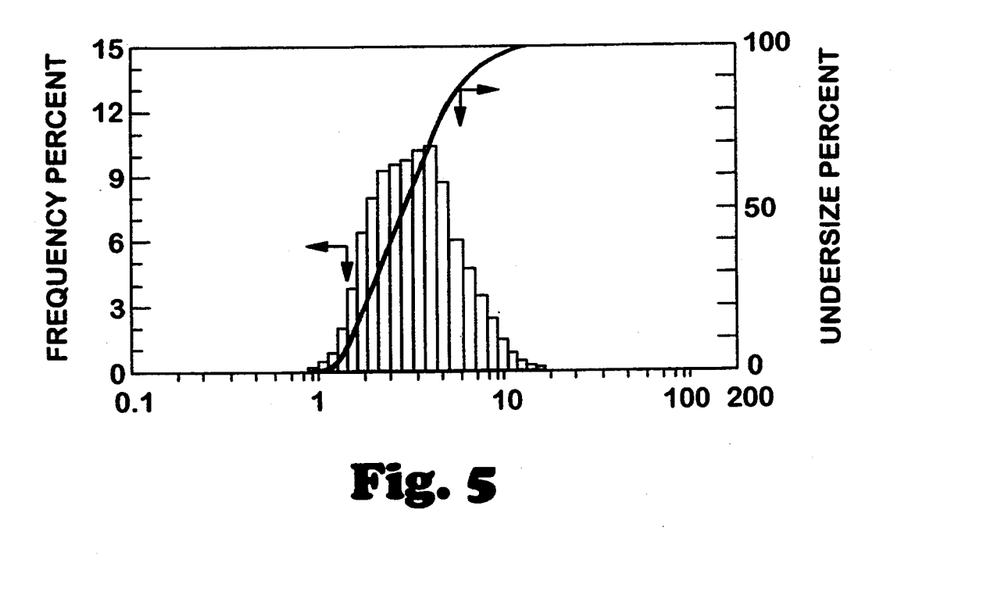
FIG. 5 is a chart showing a particle size distribution for enhanced calcium fluoride precipitates made in accordance with the invention.
Figure 6:
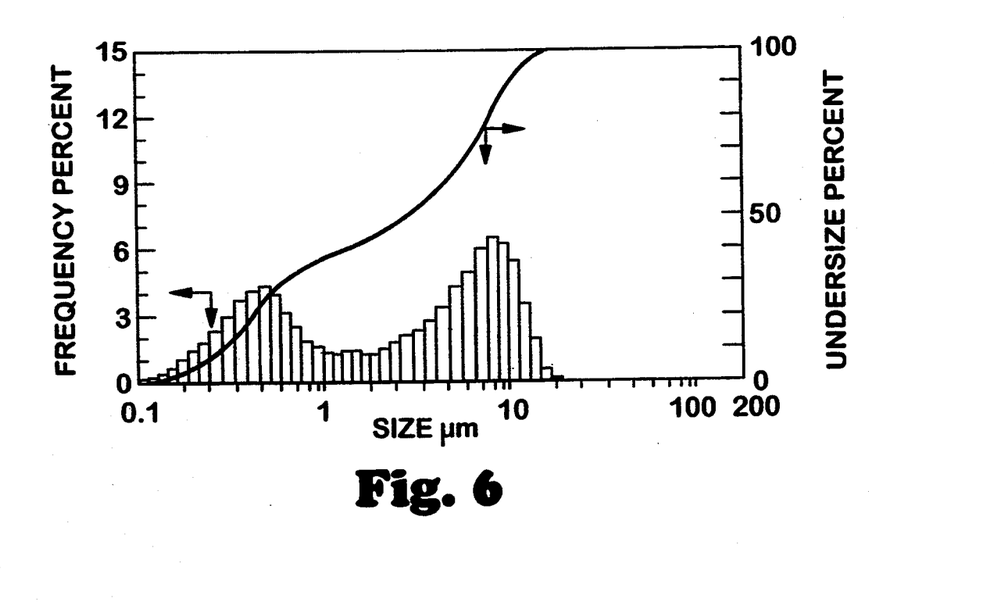
FIG. 6 is a chart showing a particle size distribution for precipitates made according to a conventional process.

This example discusses a particularly advantageous feature of the invention, the ability to increase the particle size of the calcium fluoride precipitate by recycling. In particular, this example shows the narrow particle size distribution attainable with the present invention. FIG. 5 shows a particle size distribution for sludge taken from reactor 20 compared to the particle size distribution in FIG. 6 for a conventional sludge. An advantage of the narrow particle size distribution of the invention (preferably greater than one micrometer) is that it produces improved settling and filtration characteristics over the conventional sludge which contains a substantial proportion of fines (less than 1 micrometer in diameter).

Example 4

Waste effluents containing substantially higher concentrations of fluoride contamination were treated in Examples 4–5, namely, an acid soluble oil (ASO) and an acid relief neutralizing (ARN) solution from a refinery alkylation unit. Prior to treatment, the ASO material showed a fluoride content of about 100,000 mg/l and the ARN material a fluoride content of about 46,000 mg/l.

Six tests were run on the ASO and ARN materials using a process of this invention. Precipitate was directly recycled for pretreatment with calcium chloride prior to treatment with the waste effluent. Tests 1–4 involved treatment of different ASO materials, each having a different fluoride concentration level and being treated by calcium ion sources having different calcium chloride concentration levels. Also treated was an ARN material (Test 5) as well as a mixture of ASO and ARN (Test 6). Parameters of these operations are shown in Table II below.

TABLE II

| Test No. | Waste Feed Source | $CaCl_2$ Conc. (Mg/Kg) | Fluoride Conc. (Mg/Kg) |
|---|---|---|---|
| 1 | ASO | 37,700 | 9,700 |
| 2 | ASO | 75,400 | 19,400 |
| 3 | ASO | 238,100 | 54,100 |
| 4 | ASO | 75,400 | 100,000 |
| 5 | ARN | 75,400 | 18,400 |
| 6 | ASO (90% V) & ARN (10% V) | 75,400 | 18,900 |

The ARN and ASO materials shown in Table II were processed in accordance with the invention and compared with conventional processes. The percent solids of the filter cakes of the invention sludge compared with those of conventional sludge are reported in Table III below.

TABLE III

| Test No. | Waste Feed Source | Solids in Filter Cake | |
|---|---|---|---|
| | | Invention | Conventional |
| 1 | ASO | 55.4 | 31.9 |
| 2 | ASO | 58.4 | 37.9 |
| 3 | ASO | 67.0 | 42.4 |
| 4 | ASO | 68.0 | 45.9 |
| 5 | ARN | 60.0 | 33.5 |
| 6 | ASO/ARN | 60.9 | 39.8 |

The filtration times of filter cakes formed from 25 ml slurries from Tests 1–6 were compared with filtration times for conventional processes, which used addition of calcium in the form of calcium chloride to the ARN and ASO streams to precipitate calcium fluoride. As seen in Table IV, below, filtrate flow rates through cakes made by this invention were far superior to those produced by conventional processes:

TABLE IV

| Test | Specific Filtrate Flow Rate (Liter/Sq. Meter Minute) | |
|---|---|---|
| | Invention | Conventional |
| 1 | 180.4 | 19.84 |
| 2 | 9.92 | 0.614 |
| 3 | 3.888 | 0.397 |
| 4 | 1.82 | 0.863 |
| 5 | 26.22 | 1.215 |
| 6 | 8.132 | 4.134 |

EXAMPLE 5

The settling behavior of enhanced calcium fluoride precipitate made in accordance with this invention was compared to the settling behavior of calcium fluoride precipitate from a conventional system. The results in Table V below shows superior settling rates for precipitates made by this invention.

TABLE V

| | Supernatant/Mud Interface Height (cm) | |
|---|---|---|
| Time (Hrs.) | Invention Sludge | Conventional Sludge |
| 0 | 18 | 18 |
| 1 | 1.8 | 17.6 |
| 2 | 1.2 | 14.9 |
| 3 | 1.1 | 9.2 |
| 16 | 0.9 | 6.824 |
| | 0.8 | 6.3 |

Clearly, this invention is not limited or restricted to the examples and embodiments described in this patent. For the sake of simplicity, the methods discussed herein refer only to calcium, magnesium, fluoride and their precipitates. However, the invention is not limited to solutions containing only such materials. Treatments involving materials in addition to those discussed herein, such as other chemicals, ingredients and even contaminants, are still within the scope of the invention.

Also, while a preferred embodiment of the invention involves two separate reactors, as shown in FIG. 1, it is contemplated that a single reactor, such as a pipe reactor, may also be used. In such a case, the calcium and fluoride ions would be introduced to the enhanced calcium fluoride mixture in different locations, so that most if not substantially all of the calcium ions would associate with the calcium fluoride or enhanced calcium fluoride precipitate before associating with the fluoride ions. Conversely, if a significant number of the calcium ions reacted with the fluoride ions instead of with previously formed calcium fluoride precipitate, the undesirable result would be a lower density sludge.

Thus, it is clear that modifications and variations can be made to this invention by those skilled in the art without departing from the scope or spirit of the invention. This invention is intended to broadly cover any such modification or variation, provided it comes within the scope of any one of the following claims or of their equivalents.

We claim:

1. A method of removing fluoride from waste water, comprising:
    contacting an amount of calcium or magnesium ion, said amount being at least approximately equal to a stoichiometric amount in relation to said fluoride in said waste water, with a first solution containing at least about 0.5 weight percent of a first precipitate comprising calcium or magnesium fluoride, to provide a second solution having a second precipitate that includes the first precipitate associated with the calcium or magnesium ion;
    contacting the second solution with waste water having at least about 100 parts per million fluoride ions, to provide a third solution having an enhanced calcium fluoride or enhanced magnesium fluoride precipitate, which includes the second precipitate associated with the fluoride ion, to provide for the removal of the fluoride from the waste water wherein the enhanced calcium fluoride or magnesium fluoride includes additional calcium or magnesium ion and fluoride ion, to provide particle growth in the first precipitate;
    removing a first portion of said third solution;
    precipitating the enhanced calcium fluoride or enhanced magnesium fluoride from said first portion of said third solution to provide a concentrated non-gelling precipitate;
    separating said non-gelling precipitate from said first portion; and
    recycling a second portion of said third solution to form the first precipitate of said first solution.

2. The method of claim 1 in which the recycled portion of the third solution is contacted with a calcium or magnesium ion in the first step, followed by contact with a fluoride ion in the waste water of the second step, to provide for an increase in particle size of the enhanced calcium or magnesium fluoride precipitate from the third solution.

3. The method of claim 1 in which the recycled portion of the third solution is transported directly, without separation of solids, to form the first solution of the first step.

4. The method of claim 1 in which the recycled portion of the third solution is treated with a hydrocyclone to provide a coarse fraction and a fines fraction, wherein the fines fraction is transported to form at least part of the first solution of the first step.

5. The method of claim 1 in which the calcium or magnesium ion in the first step comprises calcium or magnesium chloride.

6. The method of claim 1 in which the first and second steps are carried out in separate reactors.

7. The method of claim 1 additionally comprising filtering said first portion of the third solution to provide a filter cake.

8. The method of claim 7 in which the mean particle size distribution of the filter cake precipitate is greater than about 1 micrometer.

9. The method of claim 7 in which there are substantially no solid particles in the filter cake with a particle size less than about one micrometer.

10. The method of claim 1 in which the particle size distribution of the sludge from the third solution is a mono-modal as shown in FIG. 5.

11. A method of removing fluoride from waste water, comprising:
    contacting calcium or magnesium ion with a first solution containing at least about 0.5 weight percent of a first precipitate comprising calcium or magnesium fluoride, to provide a second solution having a second precipitate that includes the first precipitate associated with the calcium or magnesium ion;

contacting the second solution with waste water having at least about 100 parts per million fluoride ions, to provide a third solution having an enhanced calcium fluoride or enhanced magnesium fluoride precipitate, which includes the second precipitate associated with the fluoride ions, to provide for the removal of the fluoride from the waste water wherein the enhanced calcium fluoride or magnesium fluoride includes additional calcium or magnesium ion and fluoride ion, to provide particle growth in the first precipitate;

removing a first portion of said third solution;

recycling said first portion to form the first precipitate of said first solution, without solids/liquid separation of the first portion prior to recycling;

precipitating the enhanced calcium fluoride or enhanced magnesium fluoride from a second portion of said third solution to provide a concentrated non-gelling precipitate; and separating said non-gelling precipitate from said second portion.

12. A method of removing fluoride from waste water, comprising:

contacting calcium chloride or magnesium chloride with a first solution having a first precipitate comprising calcium or magnesium fluoride, to provide a second solution having a second precipitate that includes the first precipitate associated with calcium or magnesium ion;

contacting the second solution with waste water containing a fluoride ion, to provide a third solution having an enhanced calcium fluoride or enhanced magnesium fluoride precipitate, which includes the second precipitate associated with the fluoride ion, to provide for the removal of the fluoride from the waste water wherein the enhanced calcium fluoride or magnesium fluoride includes additional calcium or magnesium ion and fluoride ion, to provide particle growth in the first precipitate;

removing a first portion of said third solution;

recycling said first portion to form the first precipitate of said first solution;

precipitating the enhanced calcium fluoride or enhanced magnesium fluoride from a second portion of said third solution to provide a concentrated non-gelling precipitate; and separating said non-gelling precipitate from said second portion.

13. The method of claim 12 in which the recycled portion of the third solution is transported directly, without separation of solids, to form the first solution of the first step.

14. The new method of claim 12 in which the recycles portion of the third solution is treated with a hydrocyclone to provide a coarse fraction and a fines fraction, wherein the fines fraction is transported to form at least part of the first solution of the first step.

15. The method of claim 12 in which the first and second steps are carried out in separate reactors.

16. The method of claim 12 in which a solids-liquid separation step is applied to the third solution for separation of solids from the solution.

17. The method of claim 12 additionally comprising filtering a portion of the third solution to provide a filter cake.

18. The method of claim 17 in which the mean particle size distribution of the filter cake is greater than about 1 micrometer.

19. The method of claim 12 in which the particle size distribution of the sludge from the third solution is mono-modal as shown in FIG. 5.

* * * * *